(12) United States Patent
Heisinger, Jr.

(10) Patent No.: US 7,430,554 B1
(45) Date of Patent: Sep. 30, 2008

(54) METHOD AND SYSTEM FOR TELEPHONICALLY SELECTING, ADDRESSING, AND DISTRIBUTING MESSAGES

(76) Inventor: Charles Gilbert Heisinger, Jr., 1328 Washington St., Evanston, IL (US) 60202

( * ) Notice: Subject to any disclaimer, the term of this patent is extended or adjusted under 35 U.S.C. 154(b) by 753 days.

(21) Appl. No.: 09/545,088

(22) Filed: Apr. 7, 2000

(51) Int. Cl.
*G06F 7/00* (2006.01)
*G06F 17/30* (2006.01)
(52) U.S. Cl. .................................. 707/10; 707/1; 707/5
(58) Field of Classification Search ............... 707/1–10, 707/100–104.1, 200–206; 709/229, 206, 709/207, 204, 217–220, 227; 379/88.17, 379/67.1; 705/26, 1
See application file for complete search history.

(56) References Cited

U.S. PATENT DOCUMENTS

| | | | |
|---|---|---|---|
| 4,792,968 A | 12/1988 | Katz | |
| 5,339,358 A | 8/1994 | Danish et al. | |
| 5,530,740 A * | 6/1996 | Irribarren et al. | 379/88.17 |
| 5,548,753 A * | 8/1996 | Linstead et al. | 707/1 |
| 5,608,786 A | 3/1997 | Gordon | |
| 5,732,216 A | 3/1998 | Logan et al. | |
| 5,737,395 A | 4/1998 | Irribarren | |
| 5,742,668 A | 4/1998 | Pepe et al. | |
| 5,781,186 A | 7/1998 | Jennings | |
| 5,805,810 A | 9/1998 | Maxwell | |
| 5,864,604 A | 1/1999 | Moen et al. | |
| 5,870,549 A | 2/1999 | Bobo, II | |
| 5,884,032 A * | 3/1999 | Bateman et al. | 709/204 |
| 5,893,091 A | 4/1999 | Hunt et al. | |
| 5,913,210 A * | 6/1999 | Call | 707/4 |
| 5,974,449 A | 10/1999 | Chang et al. | |
| 5,982,868 A | 11/1999 | Shaffer et al. | |
| 5,987,503 A | 11/1999 | Murakami | |
| 5,999,965 A | 12/1999 | Kelly | |
| 6,029,192 A | 2/2000 | Hill et al. | |
| 6,032,192 A | 2/2000 | Wegner et al. | |
| 6,055,513 A | 4/2000 | Katz et al. | |
| 6,067,516 A | 5/2000 | Levay et al. | |
| 6,070,142 A | 5/2000 | McDonough et al. | |
| 6,073,165 A | 6/2000 | Narasimhan et al. | |
| 6,078,650 A | 6/2000 | Hansen | |
| 6,081,842 A | 6/2000 | Shachar | |
| 6,084,952 A | 7/2000 | Beerman et al. | |
| 6,085,231 A | 7/2000 | Agraharam et al. | |
| 6,088,429 A | 7/2000 | Garcia | |
| 6,154,738 A * | 11/2000 | Call | 707/4 |
| 6,311,210 B1 * | 10/2001 | Foladare et al. | 709/206 |
| 6,404,884 B1 * | 6/2002 | Marwell et al. | 709/206 |
| 6,418,441 B1 * | 7/2002 | Call | 707/10 |

* cited by examiner

*Primary Examiner*—Jean B Fleurantin
(74) *Attorney, Agent, or Firm*—Kramer & Amado, P.C.

(57) ABSTRACT

A method and system of selecting, addressing, and distributing messages utilizing an Internet website as the registration and administration means and a database for the address routing means and through the use of a telephone and the associated DTMF signals is disclosed. One embodiment provides a system that looks up an electronic address in an Internet-website created and maintained data table based on the ANI (automatic number identification) provided with an inbound telephone and allows selection of a message, such as a reminder, a promotional message, or a purchase order, through the use of keycodes in the form of DTMF signals generated from a telephone keypad. Upon receiving the keycodes, an e-mail message, a fax message, postal mail contact data, or a time-delayed voice mail message is sent over the Internet or over another communications network or to a datafile.

24 Claims, 6 Drawing Sheets

Internet Registration Web Page — 301

1. To register, enter your name and your home, work, or cellular phone number as the originating phone number.

Name: ⎯ 300
Originating Phone Number: ⎯ 302
Pin # (req'd for remote access): ⎯ 304

2. Enter addresses where you want your information sent:

Internet Email Address: ⎯ 306
Fax Phone number: ⎯ 308
Voice Phone number: ⎯ 310
314 ⎯ US Postal Address: ⎯ 312
City, State Zip:
316 ⎯ Credit Card No.         Expires
315

Submit  Cancel ⎯ 318

FIG. 3B

Structure for Address Data Table — 319

| Originating Phone Number (320) (Primary Key) | PIN # (322) | Delivery Option (324) (Secondary Key) | User Name (325) | Credit Card no. (326) | Exp. Date (327) | Destination Address (328) |
|---|---|---|---|---|---|---|
| 3125551212 | 1234 | 1 | Bob Smith | 1234567890123456 | 0801 | xyz@123.net |
| 3125551212 | 1234 | 2 | Bob Smith | 1234567890123456 | 0801 | 3128765432 |

FIG. 3C

Structure for Message Data Table — 329

| Keycode (330) (Primary Key) | Delivery Option (332) (Secondary Key) | Message File name (334) | Advertiser Address (336) |
|---|---|---|---|
| 1234 | 1 | 1234.htm | Sales@abc.com |
| 8765 | 2 | 8765.tif | Sales@xyz.com |

METHOD AND SYSTEM FOR TELEPHONICALLY SELECTING, ADDRESSING, AND DISTRIBUTING MESSAGES

BACKGROUND

1. Field of the Invention

The present invention relates to a method and system for retrieving information in response to caller input from a telephone keypad and for delivering the information to an address specified by destination address information maintained through an Internet website and stored in a database, which is selected based on caller identification provided electronically with the inbound telephone call, and in a distribution means specified by the caller.

2. Description of Prior Art

At the present time, the applicant is unaware of any existing prior art method or system utilizing an Internet website as its registration and administration means and a database as its address routing means that would enable a user to respond to a mass media advertisement or other announcement by simply dialing a phone number and entering a "keycode" (a code which identifies the particular advertisement offer), with the identification of the caller provided by the ANI (automatic number identification) of the calling phone.

To date, direct-response mass-media advertising has relied primarily on a variety of direct response methods, such as manned 800 numbers. These methods do not permit the responder to simply, quickly, and automatically specify how and by what means additional information will be sent to the responder. Where direct response requires payment information, this information must be located by the caller and correctly communicated over the phone, often a laborious and error-filled process.

When responding to an advertisement by accessing information on an interconnected network, such as the Internet, the user is required to have a certain amount of knowledge regarding an Internet website address, or URL—uniform resource locator, before the user can successfully access a particular website. If the user does not input the exact URL, punctuated correctly, access will be denied and the user will need to resort to a sometimes lengthy and laborious search process to determine the correct address for the site. Given the present volume of advertising which includes a brief mention of an advertiser's website address, remembering a particular advertisement for a site may be difficult, thereby decreasing the probability of further investigation of an advertiser's products or services. The demands of precise and accurate URL addressing as a requirement for accessing the Internet creates a barrier for most people to take full advantage of this information source.

Prior art systems overcome this problem through the use of Internet search engines to help users determine the correct URL for a website from a selection of sites that have been selected based on key words. Once the user has input key words, summaries of websites and their associated URL's are presented for selection. By selecting a particular URL, the user is linked to the chosen website.

Internet and online service providers, such as AOL, may also offer keywords for advertisers to include in their ads. These keywords are theoretically easier for a user to remember than the www.websitename.com combination. Keywords, however, must be remembered from the time the individual hears them to the time of Internet access, which in a majority of cases is not immediate. As URL's, keywords are also subject to spelling and punctuation mistakes.

SUMMARY

In accordance with the present invention, a method and system for telephonically selecting, addressing, and distributing messages is disclosed that uses an automatic process to handle the tasks of creating and sending a message to an address that is stored in a database by a user through an Internet website. The body of the message is identified through use of a keycode, which is supplied by an advertiser or other promoter through a media channel, such as radio, TV, or print. Where the message constitutes an order to purchase, the caller's payment information, such as a credit card number, may be transmitted as part of the message.

OBJECTS AND ADVANTAGES

It is therefore an object of the present invention to provide a method of utilizing automatic phone number identification and entered keycode information for direct response purposes in mass-media advertising.

It is yet another object of the present invention to provide a method for selecting, addressing, and distributing an electronic message through the convenience and use of a telephone.

It is yet another object of the present invention to provide a method to communicate user payment information to an advertiser as part of a purchase transaction.

It is yet another object of the present invention to provide a method for accessing specific Internet websites where the URL information may be provided to the user via fax, e-mail, postal mail, delayed voice mail, or accessed from a web site.

Yet another object of the present invention is to provide a convenient method of registration, administration, and maintenance of a user's address and payment information through an Internet website and a database accessed through said website.

Briefly, a method for accessing advertising messages through the use of a telephone and the associated dual tone multifrequency (DTMF) signals is disclosed. The preferred embodiment of the present invention provides a system that compares the ANI of an inbound telephone call with an address previously input by the user in a database through an Internet web site. Specific stored messages are retrieved from a database by the user through the use of DTMF signals as generated from a telephone key pad. Upon receiving a DTMF signal with delivery information, the message is sent either via fax, email, postal mail, time-delayed voice mail, or stored on a data table which is accessible through a web site, depending on the option specified by the user. Payment information, such as a credit card number, may be included with the message.

One advantage of the present invention is that it provides a message for reminding the user of the user's interest in information, including, but not limited to a company's website.

Yet another advantage of the present invention is that it provides accurate address and contact information, including, but not limited to, information about a website address.

Yet another advantage of the present invention is that it allows the user to select the distribution method of the message, be it fax, e-mail, postal mail, delayed voice mail, or web site.

Yet another advantage of the present invention is that it allows the user to communicate accurate payment information to an advertiser when the message is a purchase order.

Yet another advantage of the present invention is that it provides easy access to registration and account maintenance functions through an Internet website.

DETAILED DESCRIPTION OF A PREFERRED EMBODIMENT

As required, a detailed illustrative embodiment of the present invention is disclosed herein. However, telephone techniques, physical communications systems, data formats, operating systems, operating structures, and network environments in accordance with the present invention may be embodied in a wide variety of forms and modes, some of which may be quite different from those in the disclosed embodiment. Consequently, the specific structural and functional details disclosed herein are merely representative.

A system according to the present invention may be comprised of a multitude of scaleable sub-systems as follows—1) a communications server, such as a Sun Sparc Station 20 operating at 75 mhz with Solaris 2.4 optimized for communications or the equivalent and including distributed message databases run on Oracle 7 database management software or the equivalent, with the following peripherals: a bank of digital signal processors capable of interactive voice response, such as a Dialogic D/320SC or the equivalent with voice message software; 2) a Printer and SMTP (Simple Mail Transfer Protocol) Server, Sun Sparc Station 5 operating at 110 mhz or the equivalent, with email mailing software, connected directly to the Internet and a local printer, such as a Sun NeWSPrinter 20 or the equivalent, 3) a Fax Server, such as a Sparc Station 5 operating at 110 mhz or the equivalent, connected to a switch that is connected to a telephone network; 4) a router, such as a Cisco 2500 series router connecting all of the servers described thus far. The sub-system is connected, to a Wide Area Network (WAN), such as an ATM or Asynchronous Transfer Mode network or the equivalent. The WAN connects multiple sub-systems through a router, such as a Cisco 2500 series router, to a central address database server, such as a Sun SparcServer 1000E operating at 85 mhz or the equivalent. The database server features Oracle relational database management software, or the equivalent, and scalable 1 GB fast/wide SCSI disk drives in a Raid 5 storage configuration.

The database server is connected to an Internet Web server, such as a SparcStation 20 running at 75 mhz with Web Hosting Software, through a Common Gateway Interface program. The Internet Web Server is connected to the Internet. The network operating system is Sun Solaris or the equivalent. System administration is provided by a workstation connected to each sub-system.

Another embodiment of the present invention could exist in a PC environment—a PC with 500 Mhz Intel Pentium III CPU or the equivalent, with 512 K Cache, 128 meg of memory, 3 gigabytes of disk space, Internet software including an email program and web hosting software, Internet port and dedicated subscriber line or the equivalent, fax software, 56 kb modem and dedicated fax line or the equivalent, digital signal processor capable of interactive voice response (Dialogic Proline/2 V or the equivalent) and telephone line, printer, Windows 2000 or the equivalent, and Relational Database Management System (RDBMS), such as Microsoft Access would suffice.

Figure 1:
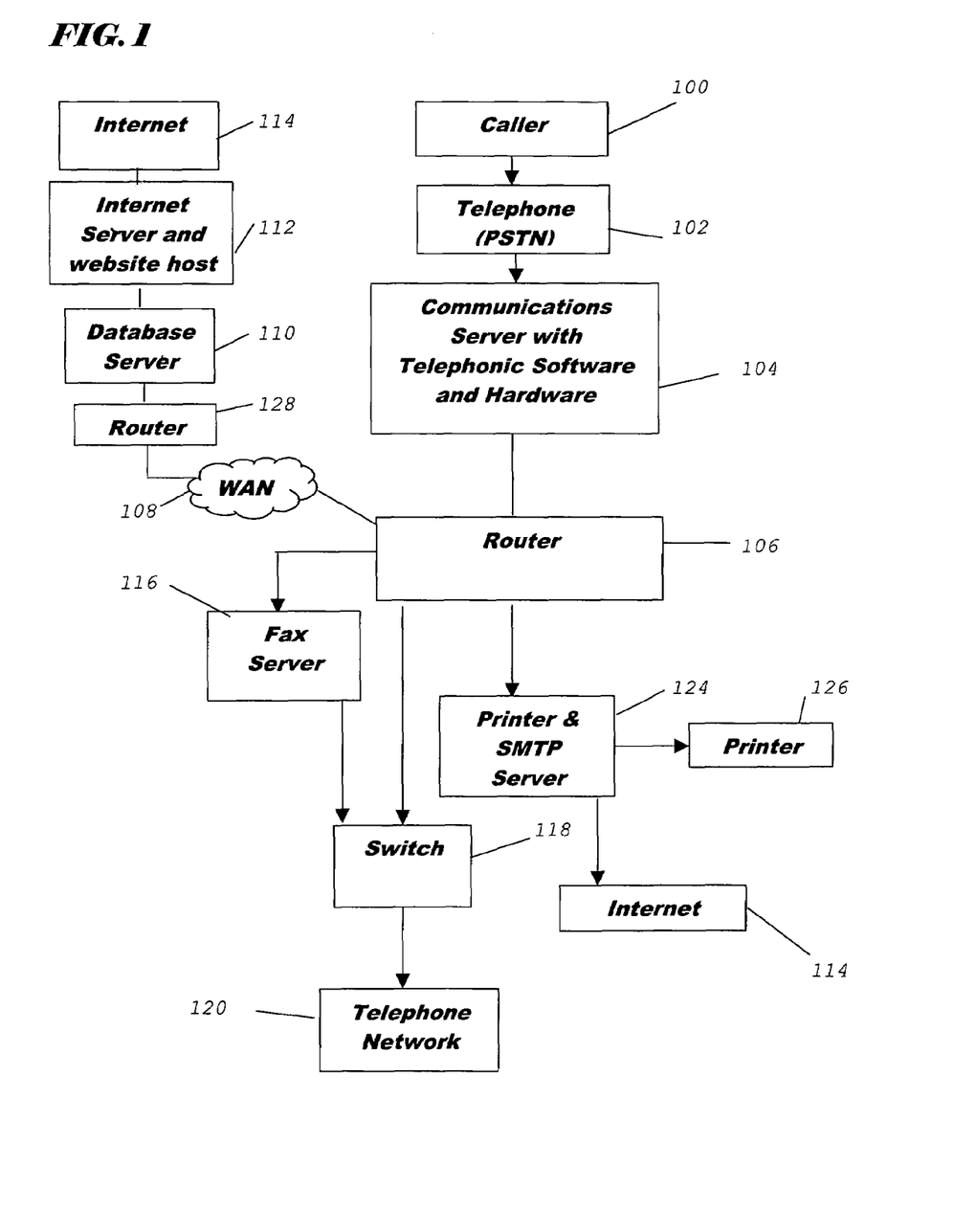
FIG. 1 is a block diagram that illustrates the hardware components of one embodiment of the present invention.

Referring to FIG. 1, one embodiment of the present invention is operated by a caller 100 using a telephone on a public switched telephone network 102 to dial into telephonic interfacing software and hardware on the communications server 104. The server 104 provides audio directions to the caller 100 and provides a number of options, which may be selected by the caller 100 through DTMF tones generated through the use of a telephone keypad. In this manner, the caller 100 is able to direct the communications server 104 to perform certain procedures. The procedures include accessing address data tables and files located on a database server 110. Data tables on this server 110 are maintained by Internet 114 access through an Internet Web Server 112. The procedures also include accessing message data tables and files located on the communications server 104. These files are updated from data tables on database server 110, which is connected to the communications server 104 through a WAN 108 and routers 128 and 106.

One available procedure is to send an email message through a Printer & SMTP server (Simple Mail Transfer Protocol—outgoing mail server) 124 to the Internet 114. Another available action is to send a facsimile via fax server 116 through a switch 118 and to a telephone network 120. Yet another option is to send a voice message through a switch 118 over a telephone network 120. Yet another option is to send a message to a data file on the Printer and SMTP Server 124 for later input to the US Postal printer 126. Yet another option is to send a message to the database server 110 for access from the Internet 114 through Internet Web Server 112.

Figure 2:
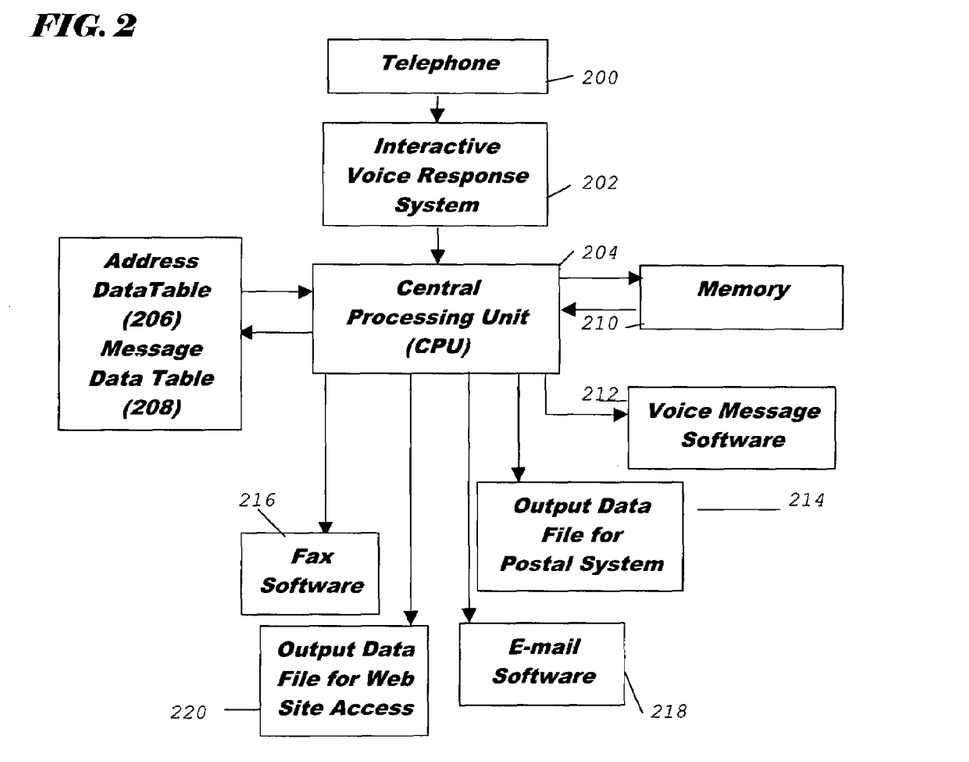
FIG. 2 is a block diagram that shows call processing elements according to the present invention.

FIG. 2 shows the call processing, message retrieval, and addressing function, without regard to the specific hardware on which the files and programs exist. An Interactive Voice Response System 202 guides a caller through a series of call menus via voice prompts and plays confirmations of DTMF tones which the caller enters from the caller's touch-tone keypad of a telephone 200. The caller-generated DTMF tones are converted into ASCII values usually by the Interactive Voice Response system 202 and then stored by the CPU 204 in memory 210. In other embodiments, the conversion from DTMF tones to ASCII text is performed by either a modem with call-management features or by a voice modem and Telephone Application Program Interface, or TAPI, software.

The Interactive Voice Response System 202 responds to the inbound call ANI and caller's touch tone selection for distribution, or routing, instructions and initiates a look-up of the address data table 206. It retrieves the stored destination address information for the message. The Interactive Voice Response System 202 also responds to the caller's touch tone selection for the keycode of the desired document by directing the CPU 204 to look up and retrieve the corresponding message file name in the message data table 208. Once the CPU 204 has located the selected message file and address, it routes the message file and destination address to either fax software 216 for faxing, an Internet email program 218 for transmission over the Internet as an email message, voice message software 212 for transmission over a telephone network, as an output data file 214 for later printing as postal mail, or as a datatable 220 for later access through a website. The CPU 204 will recognize an order to purchase message from the presence of an advertiser address in the message data table 208. The CPU 204 will create a second message including credit card information addressed to the advertiser.

Figure 3A:
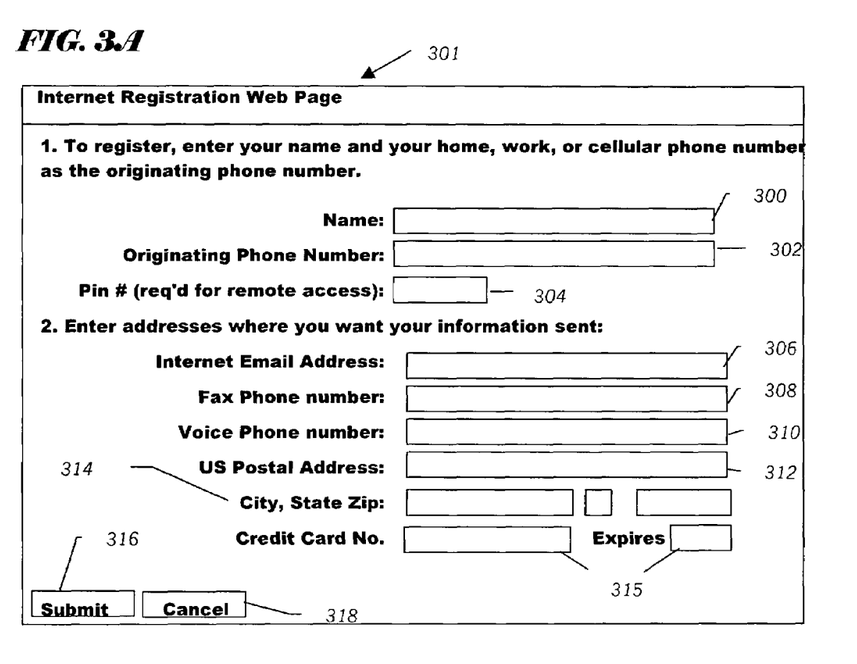
FIG. 3A is a screen print that illustrates a Internet Registration Web Page for entering user data into an address data table.

FIG. 3A illustrates an Internet registration web page for entering user data into an address data table according to the present invention. The form requests the user name 300, an originating phone number 302, which serves as the primary index key for the address data table, and a pin #304 for system security. The form requests an email address 306, a fax phone number 308, a voice phone number 310, a US postal address 312 including city, state and zip code information 314, and credit card number and expiration date information 315. These four address requests are destination addresses for the distributed messages. The credit card information is payment information for inclusion in purchase order message. The form can be submitted 316 to the Internet Web Server 112 and then on to the database server 110 for saving, or canceled 318 by clicking on the appropriate button.

Figure 3B:
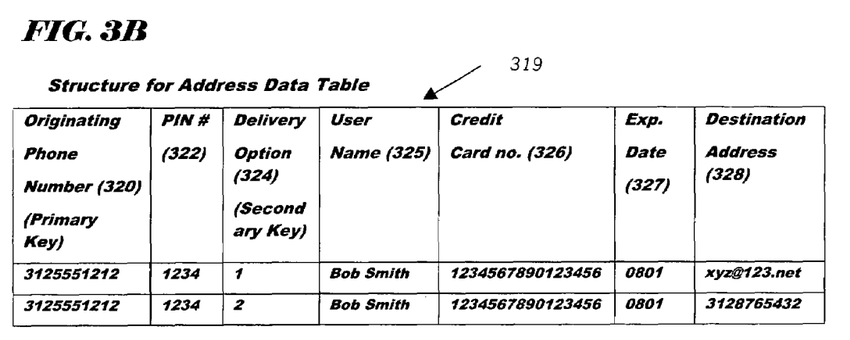
FIG. 3B is a diagrammatical view that shows the structure of an address data table according to the present invention.
Figure 3C:
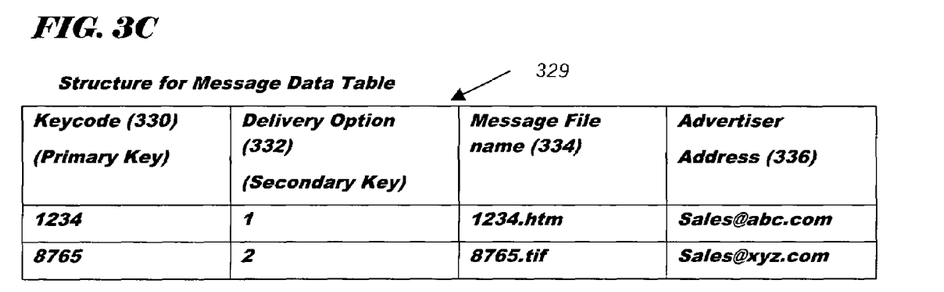
FIG. 3C is a diagrammatical view that shows the structure of a message data table according to the present invention.

FIGS. 3B and 3C are views of data tables of a relational database according to the present invention.

FIG. 3B shows the structure of an address data table according to the present invention. The address data table 319 contains an originating phone number as the primary key 320 and a delivery option as a secondary key 324. Together, these keys form a unique key index to the table. Additional columns in the address data table 319 include the pin #322, the user name 325, credit card number 326, credit card expiration date 327, and the destination address 328. Each row of the table 319 is uniquely identified by a composite of the originating phone number 320 and delivery option 322.

FIG. 3C shows the structure of a message data table 329 according to the present invention. The primary key field of this table 329 is the keycode 330. The secondary key is the delivery option 332. Together, these keys form a unique key index for the table 329. Column 334 references the name of the message file. Column 336 indicates the address of the advertiser, where the message is a purchase order. Each row of the table 329 is uniquely identified by a composite of the keycode 330 and delivery option 332.

Operation

Registration and Storage of User Information on an Internet Website

Referring to FIG. 3A, to register as a user of the system, an individual must visit a web site and enter their name 300 and a calling or originating phone number 302 along with a pin #304 on the registration web page 301. The individual must also input one or more of the following: an Internet e-mail address 306, a fax telephone number 308, voice phone number 310, or a US postal address 312 with city, state, and zip code information 314, and credit card number and expiration date 315. These addresses become the destination addresses for the information messages. Upon submission, the Internet Web Server uses a CGI program to append the information to a row in the address data table 319 for each destination address that has been entered on the form. The primary key index of the address data table 319 is the originating phone number 320 and the secondary key index value is a delivery option 324 which is defined as follows: 1=Internet e-mail address and web site access, 2=fax phone number, 3=voice message phone number, 4=US Postal Address (including delimited city, state, and zipcode information). Each row of the address data table 319 contains a primary 320 and a secondary key index 324, a pin #322, the user name 325, credit card number 326, credit card expiration date 327, and one destination address 328.

Creation of Information Message Content

Messages are created and loaded onto a database server 110 by advertisers and informational sponsors of the system. The messages may assume several different file formats, each suitable for a different method of distribution. For instance, one message may appear as ASCII text for emailing and as a tagged image file format, or .tif, for faxing. The messages may be loaded by over the Internet 114 and through the Internet Web Server 112 using a file transfer protocol (FTP) or by manual means, such as diskette. In addition to loading the formatted files, the message data table 208 must be appended with a row containing the following information: Keycode (Primary Key Index of the table) of the message 330, Delivery Option (Secondary Key Index of the table) 332, the file name of the formatted file 334, and the advertiser address 336. The data server 110 sends copies of the updated datatable 208 and the messages over the WAN 108 and routers 106 and 128 to the communications server 104, where identical distributed copies of the message datatable 208 and message files reside.

User Telephone Interface

Figure 4:
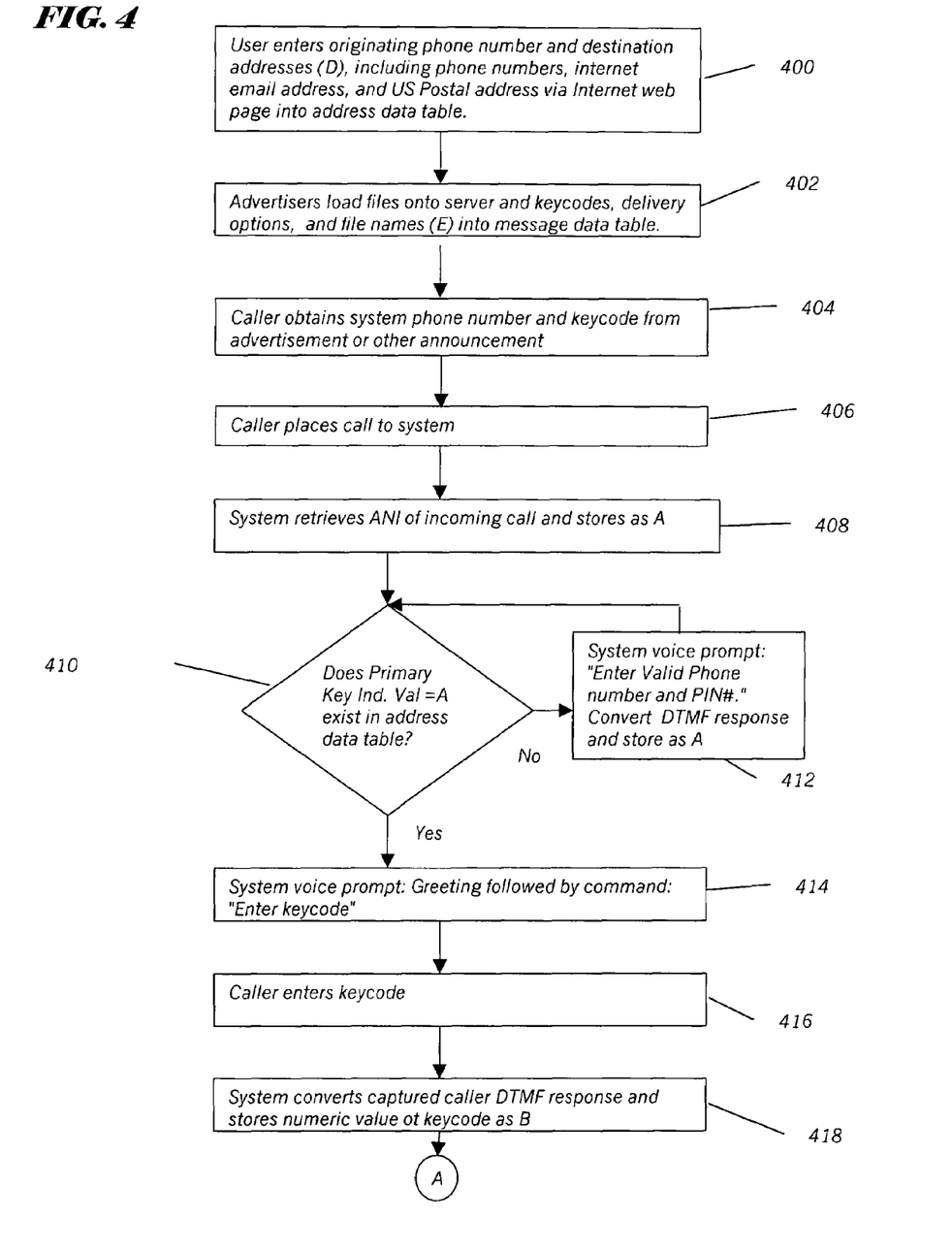
FIGS. 4 & 5 are flow charts illustrating the step-by-step operation of one embodiment of the present invention.
Figure 5:
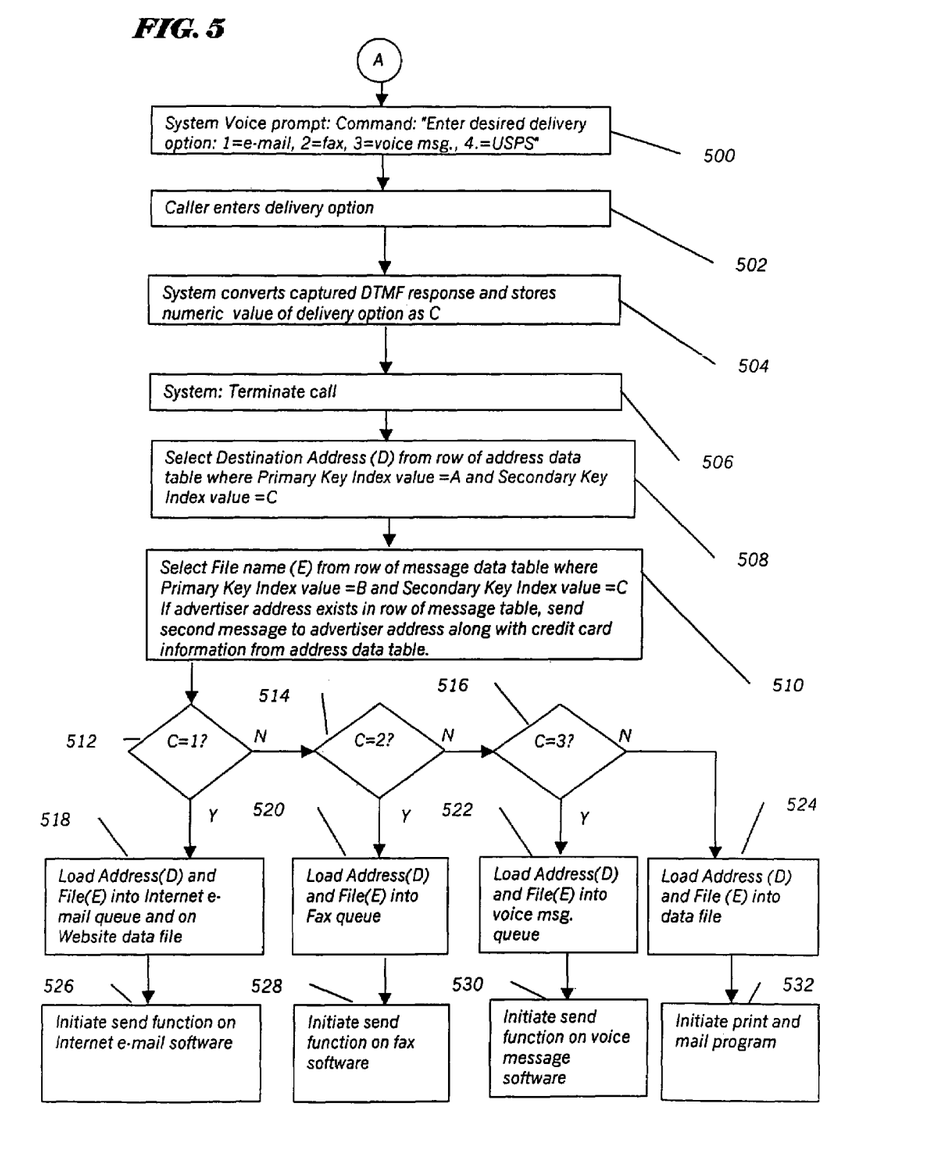

FIGS. 4 & 5 chart the steps necessary to operate a system according to the present invention. Users must register to use the system. Step 400 is accomplished on an Internet registration web page form, where a user enters user information, an originating phone number, pin #, and desired destination addresses and credit card information. The Internet Web Server sends this information to be appended to the address data table on the database server. In step 402, advertisers and suppliers of information content must upload their information files to the database server, either via the Internet or by other media, such as diskette. Copies of messages and the updated message table are copied to the communications server.

Once the user has registered and the information providers have loaded their information content, the system is ready for operation. The caller obtains the system phone number and Keycode from a mass-media advertisement or other announcement 404. The system phone number may be a local number, an 800 number, or even a 3 digit number along with an additional digit, such as 411 plus the #, or pound sign. In the case of a 411 number, the pound sign is known as a "cut-through" digit and would "cut-through" a telephone company switch which is part of the Public Switched Telephone Network to access a computer server for the caller. The caller places a call to the system in step 406.

In step 408, the ANI, more commonly known as caller ID, will be transmitted at the beginning of the call to the Interactive Voice Response system and is stored in memory. The address data table is then looked-up to determine if the ANI exists as a Primary Key Index value 410. If it does not, the caller will be prompted to enter a phone number which is a valid, registered, originating phone number and a valid pin #412.

The Interactive Voice Response system, generates a voice prompt, asking the caller for a keycode associated with the information that the caller desires 414. The caller inputs the keycode 416.

In step 418, the Interactive Voice Response system captures the DTMF keycode response and converts it to an ASCII value to be stored by the CPU in memory. The system will then prompt the caller for the desired means of distribution in step 500. The caller will indicate a choice represented by pressing a digit on the keypad in step 502. In step 504, the Interactive Voice Response system will capture the DTMF response and convert it to an ASCII value and direct the CPU to store the value in memory. The incoming call is then terminated 506. The CPU will select a destination address from a row of the address data table where the Primary Key Index Value is equal to the originating phone number in memory and the Secondary Key Index Value is equal to the Delivery Option 508. In step 510, the CPU selects the file name of the message by looking up the row in the message data table where the Primary Key Index Value is equal to the stored Keycode value and the Secondary Key Index Value is equal to the Delivery Option stored in memory. If the message data table contains an advertiser address, the message is considered a purchase order and a second message will be created with credit card information and addressed to the advertiser. The CPU determines the routing of the message from several conditional program statements 512, 514, and 516. Depending on the stored value of the delivery option, the destination address and a file stored in the communications server with the selected file name are sent to the input queue of one of the delivery software subsystems: the Internet email program and web site data table 518, the fax transmission software 520, voice message software 522, or the US Postal mail software 524. The send function of the appropriate delivery subsystem is then initiated: the SMTP Internet e-mail program 526, the fax transmission software 528, voice message software 530, or the US Postal mail software 532.

CONCLUSION, RAMIFICATIONS, AND SCOPE

Accordingly, the reader will see that the method and system for telephonically selecting, addressing and distributing messages described here represents a major enhancement for mass-media audiences to gain information about products, services, and information content.

Furthermore the present invention provides the following advantages:
  it permits convenient access to additional product news and information content, by means of the nearest telephone.
  it provides fast and easy access, through a minimal number of digits entered through a telephone keypad.
  it permits wide user choices in delivery of information.
  it permits easy and accurate purchasing capability for advertised goods and services.
  it yields accurate information in printed or verbal form, especially concerning website addresses.
  it provides non-human 24 hour, 7 day per week, means of registration and database updates.

Although the description above contains many specificities, these should not be construed as limiting the scope of the invention but as merely providing illustrations of some of the presently preferred embodiments of this invention. For example, the telephone may be wireless and the distribution methods may include paging systems.

Thus, the scope of the invention should be determined by the appended claims and their legal equivalents, rather than by the examples given.

I claim:

1. A method of addressing an electronic message, comprising the steps of:
  providing a first database containing stored telephone numbers and user addresses for each of the stored telephone numbers;
  providing a second database containing identification codes and product information corresponding to each of the identification codes;
  receiving a telephone call from a user including one of the identification codes;
  identifying the received telephone number from the telephone call;
  retrieving the user address from the first database by comparing the received telephone number with the stored telephone numbers;
  retrieving the product information corresponding to the received identification code;
  addressing the electronic message according to the retrieved address; and
  sending at least a portion of the retrieved product information via the electronic message, wherein the first and second databases are used to create the electronic message.

2. The method as recited in claim 1, wherein the electronic message is a fax.

3. The method as recited in claim 1, wherein the electronic message is an e-mail.

4. The method as recited in claim 1, wherein the electronic message is a voice mail.

5. The method as recited in claim 1, wherein the user information includes payment instructions and the payment instructions are sent via the electronic message.

6. The method as recited in claim 1, wherein the second electronic message includes an advertisement or an order confirmation.

7. A system for addressing an electronic message, comprising:
  a first database containing stored telephone numbers and user information corresponding to each of the stored telephone numbers;
  a second database containing identification codes and addressing information corresponding to each of the identification codes;
  a receiver for accepting a telephone call from a user including one of the identification codes;
  an ANI for identifying the received telephone number from the telephone call;
  a processor; and
wherein the first and second databases are used to create the electronic message and the processor retrieves the user information from the first database by comparing the received telephone number with the stored telephone numbers, retrieves the addressing information corresponding to the received identification code, addresses the electronic message according to the retrieved addressing information, and sends at least a portion of the retrieved user information via the electronic message.

8. The system of claim 7, wherein the electronic message is a fax.

9. The system of claim 7, wherein the electronic message is an e-mail.

10. The system of claim 7, wherein the electronic message is a voice mail.

11. The system of claim 7, wherein the user information includes payment instructions and the payment instructions are sent via the electronic message.

12. The system of claim 7, wherein the user information includes a user address and the user address is sent via the electronic message.

13. The system of claim 12, further including a second processor and wherein the second processor retrieves the user address from the electronic message.

14. The system of claim 13, wherein the second processor sends a second electronic message to the user.

15. The system of claim 14, wherein the second electronic message includes an advertisement.

16. A method of addressing an electronic message, comprising the steps of:

providing a first database containing stored telephone numbers and corresponding payment instructions and user addresses:

providing a second database containing identification codes and addressing information corresponding to each of the identification codes;

receiving a telephone call from a user including one of the identification codes;

identifying the received telephone number from the telephone call using an ANI;

retrieving the user information from the first database by comparing the received telephone number with the stored telephone numbers;

retrieving the addressing information corresponding to the received identification code;

addressing the electronic message according to the retrieved addressing information; and sending the payment instructions via the electronic message, wherein the first and second databases are used to create the electronic message.

17. A method of purchasing a product, comprising the steps of:

providing a first database containing stored telephone numbers and user information corresponding to each of the stored telephone numbers;

providing a second database containing identification codes and product information corresponding to each of the identification codes;

receiving a telephone call from a user including one of the identification codes;

identifying the received telephone number from the telephone call;

retrieving the user information from the first database by comparing the received telephone number with the stored telephone numbers;

retrieving the product information corresponding to the received identification code; and purchasing the product with an electronic message based upon the user information retrieved from the first database and the product information retrieved from the second database, wherein the first and second databases are used to create the electronic message.

18. The method as recited in claim 17, wherein user information includes address information.

19. The method as recited in claim 18, wherein address information includes shipping information.

20. The method as recited in claim 19, wherein shipping information includes delivery method information.

21. The method as recited in claim 18, wherein address information includes billing information.

22. The method as recited in claim 17, wherein user information includes payment instructions.

23. The method as recited in claim 22, wherein payment instructions include credit card information.

24. The method as recited in claim 17, further comprising the step of shipping the product.

* * * * *

UNITED STATES PATENT AND TRADEMARK OFFICE
CERTIFICATE OF CORRECTION

| | | |
|---|---|---|
| PATENT NO. | : 7,430,554 B1 | Page 1 of 1 |
| APPLICATION NO. | : 09/545088 | |
| DATED | : September 30, 2008 | |
| INVENTOR(S) | : Charles Gilbert Helsinger, Jr. | |

It is certified that error appears in the above-identified patent and that said Letters Patent is hereby corrected as shown below:

In claim 6, column 8, line 21, delete "second".

Signed and Sealed this

Twenty-fifth Day of May, 2010

David J. Kappos
*Director of the United States Patent and Trademark Office*